United States Patent Office 3,291,752
Patented Dec. 13, 1966

3,291,752
PROCESS FOR PREPARING A SODIUM-POTASSIUM CARBONATE POLYMERIZATION CATALYST
James Keith Hambling and John Grebbell, Sunbury-on-Thames, England, assignors to The British Petroleum Company Limited, London, England, a British joint-stock corporation
No Drawing. Filed May 6, 1963, Ser. No. 278,411
Claims priority, application Great Britain, May 7, 1962, 17,432/62
3 Claims. (Cl. 252—443)

This invention relates to a process for preparing an improved polymerization catalyst and to the use of said catalyst in a polymerization process.

In our pending U.K. patent specification 933,253 there is disclosed a polymerization catalyst composition comprising an elemental alkali metal having an atomic number less than 19 dispersed on an anhydrous potassium compound. There is further disclosed in said patent specification a method of preparing such a catalyst which comprises mixing the molten alkali metal with the anhydrous potassium compound.

It has now been found that if the dispersion of the alkali metal on the support is carried out at a temperature not exceeding 250° C., a catalyst composition is obtained which retains its polymerization activity for a longer period of time than similar catalyst compositions prepared by effecting the dispersion at temperatures exceeding 250° C.

Accordingly the present invention provides a process for preparing a polymerization catalyst composition comprising dispersing elemental sodium or lithium on an anhydrous potassium compound at a temperature not exceeding 250° C. Preferably the temperature will not exceed 150° C.

Suitable potassium compounds are potassium hydroxide and potassium salts of inorganic acids. Suitable potassium salts of inorganic acids are the silicate, sulphate and halides; the preferred salt is potassium carbonate.

Of the alkali metals commercially available, sodium is the most readily obtained and it is the preferred metal for deposition on the support material. If desired, however, lithium may be employed.

Preferably the molten sodium or lithium is stirred vigorously with the potassium compound in a finely divided form. Suitably the potassium compound will have a particle size less than 100 mesh B.S.S., although pellets and granules may also be used. Usually it is desirable to provide a blanket of an inert gas, e.g. nitrogen whilst mixing is carried out.

The amount of elemental metal employed is generally between 1 and 20% by weight of the potassium compound, preferably between 2 and 7% and more preferably between 4 and 6% by weight.

According to another aspect of the present invention an olefinic hydrocarbon having at least three carbon atoms per molecule is polymerized alone or with at least one other polymerizable or co-polymerizable compound in contact with a catalyst prepared as hereinbefore described.

Usually a pre-formed catalyst will be brought into contact with the olefinic hydrocarbon, but this is not essential if the polymerization conditions are such that the catalyst will form in situ and in this case elemental sodium or lithium and potassium compound or compounds as hereinbefore described may be brought into contact with the olefinic hydrocarbons.

The catalyst prepared according to the invention is particularly suitable for the polymerization of olefinic hydrocarbons having three or more carbon atoms, either alone or with at least one other polymerizable or co-polymerizable hydrocarbon, to low molecular weight products. Suitable feedstocks include propylene, isobutylene, butadiene and isoprene or mixtures of such compounds, or mixtures with ethylene. Alphaolefins are the preferred feedstocks.

The catalyst is of particular value for effecting the dimerisation of propylene, the product usually containing a high proportion of 4-methylpentene-1.

Usually temperatures in the range 100° C. to 400° C. preferably 100–200° C, will be employed in order to effect the desirable polymerization of mono-olefins and temperatures in the range −10° C. to 50° C. are suitable for polymerizing dienes; the temperature being selected with regard to the ease of polymerization of the selected monomer.

As stated hereinbefore, the catalyst may be employed for production of dimers in major proportion from propylene; in this case the preferred reaction temperature will be generally in the range 100° C. to 200° C. and preferably 130–180° C. Above 200° C. higher polymers are formed, for example at temperatures in the range 200° C. to 300° C, propylene trimer and tetramer may be obtained.

According to one embodiment of this invention there is provided a process for the production of 4-methylpentene-1 which comprises dimerizing propylene in contact with a catalyst composition prepared as hereinbefore described, and recovering from the product of a $C_6$ fraction consisting of or containing 4-methylpentene-1.

Usually the reaction pressure will be at least atmospheric, and may be up to 4000 lbs./sq. in. gauge. Preferably the pressure is between 800 and 2500 p.s.i.g. and more particularly between 1400 and 1700 p.s.i.g.

The polymerization may be carried out batch wise or in a continuous manner and in the latter instance space velocities between 0.5 and 10 v./v./hr. are preferred. The combination of polymerization conditions employed will be selected according to the reactivity of the olefinic compound, the activity of the catalyst system and the nature of the product required.

The process may be carried out either in the presence or absence of a normally liquid solvent. Preferred solvents are hydrocarbons for example normally liquid paraffins of which n-heptane is particularly suitable.

The invention is illustrated by the following example.

A catalyst was prepared by dispersing 5.13% wt. of sodium metal on an anhydrous potassium carbonate at 150° C. The catalyst was then used to dimerise propylene at a feed rate of 1 vol, per vol. cat. per hour at 160° C. and a pressure of 1500 p.s.i.g. The maximum yield reached approximately 180 gm. hexenes per hour per mole of alkali metal on the catalyst, whereafter the decay rate was 2.57 gms. hexenes per hour per mole per day.

A similar catalyst was prepared at 350° C., and in this case, after reaching a maximum yield of approximately 180 gms. hexenes/hour/mole, the decay rate was 3.08 gms./hour/mole/day.

In other words the half life of the catalyst prepared according to the present invention was increased from 29 days to 34 days.

We claim:
1. A process for the production of a catalyst suitable for polymerizing olefinic hydrocarbons selected from the group consisting of an olefinic hydrocarbon having at least three carbon atoms per molecule and mixtures of said olefinic hydrocarbon with at least one other hydrocarbon copolymerizable therewith, comprising: dispersing elemental sodium on anhydrous potassium carbonate at a temperature below about 250° C.

2. A process according to claim 1, in which the temperature of dispersion is below about 150° C.

3. A process according to claim 1, in which the elemental sodium is dispersed on said anhydrous potassium carbonate in an amount of from 1 to 20%, by weight, of said potassium carbonate.

References Cited by the Examiner

UNITED STATES PATENTS

| | | | |
|---|---|---|---|
| 3,095,461 | 6/1963 | Wilkes | 260—683.15 |
| 3,104,271 | 9/1963 | Lindsay | 260—683.15 |
| 3,185,745 | 5/1965 | Lindsay | 260—683.15 |
| 3,207,812 | 9/1965 | Hambling et al. | 260—683.15 |

DELBERT E. GANTZ, *Primary Examiner.*

PAUL M. COUGHLAN, *Examiner.*

R. H. SHUBERT, *Assistant Examiner.*